(12) United States Patent
Kliem et al.

(10) Patent No.: US 12,483,481 B2
(45) Date of Patent: Nov. 25, 2025

(54) NETWORK DISCOVERY METHOD

(71) Applicant: Airbus Operations GmbH, Hamburg (DE)

(72) Inventors: Daniel Alexander Kliem, Hamburg (DE); Pascal Urban, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 66 days.

(21) Appl. No.: 18/463,944

(22) Filed: Sep. 8, 2023

(65) Prior Publication Data

US 2024/0106714 A1 Mar. 28, 2024

(30) Foreign Application Priority Data

Sep. 26, 2022 (EP) .................... 22197876

(51) Int. Cl.
*H04L 41/12* (2022.01)
*H04L 61/255* (2022.01)

(52) U.S. Cl.
CPC ............ *H04L 41/12* (2013.01); *H04L 61/255* (2013.01)

(58) Field of Classification Search
CPC ....... H04L 41/12; H04L 61/255; H04L 12/40; H04L 12/403; H04L 12/42; H04L 12/44;
(Continued)

(56) References Cited

U.S. PATENT DOCUMENTS

2005/0169193 A1* 8/2005 Black ............... H04L 41/12 370/254
2006/0171329 A1 8/2006 Ying
(Continued)

FOREIGN PATENT DOCUMENTS

EP 2012547 A1 1/2009
EP 3324580 B1 * 12/2019 ............. H04L 12/18
WO 2007092931 A2 8/2007

OTHER PUBLICATIONS

W. Htira, O. Dugeon and M. Diaz, "STAMP: Towards a Scalable Topology Announcement and Management Protocol," 22nd International Conference on Advanced Information Networking and Applications (aina 2008), Gino-wan, Japan, 2008, pp. 683-690, doi: 10.1109/AINA.2008.46. (Year: 2008).*

(Continued)

*Primary Examiner* — Christopher Biagini
(74) *Attorney, Agent, or Firm* — Greer, Burns & Crain, Ltd.

(57) ABSTRACT

A network discovery method includes: sending, by a master node in a logical root hierarchy level of a data network, a discovery message including a forwarding counter to a first slave node in the data network first logical hierarchy level via a child port; increasing, by the first neighboring slave node, the forwarding counter; forwarding the discovery message with the increased forwarding counter to a second slave node in the first logical hierarchy level; receiving, by the first and second slave nodes, context information from the master node regarding the identities of the master node and the child port; determining, by the first and second slave nodes, its own functional designation based on the forwarding counter and the received context information by comparison with a mapping table; and updating the mapping table by matching the recorded functional designation in the mapping table with the first and slave node identities.

12 Claims, 2 Drawing Sheets

(58) Field of Classification Search
CPC ............. H04L 2012/4028; H04L 45/02; H04L 41/0893; H04L 41/0894; H04L 41/122; H04L 43/10; H04L 43/12; H04L 45/26; H04L 45/48

See application file for complete search history.

(56) References Cited

U.S. PATENT DOCUMENTS

| | | | |
|---|---|---|---|
| 2008/0013502 A1* | 1/2008 | Clark ..................... | G08C 17/00 370/338 |
| 2010/0165883 A1* | 7/2010 | Holness ................ | H04L 12/437 370/255 |
| 2011/0116366 A1* | 5/2011 | Smith ..................... | H04L 45/03 370/256 |

OTHER PUBLICATIONS

European Search Report for corresponding European U.S. Appl. No. 22/197,876 dated Feb. 22, 2023; priority document.

* cited by examiner

| | MT1 | MT2 | MT3 | MT4 |
|---|---|---|---|---|
| | *1st Direction* | *2nd Direction* | *Function* | *Element* |
| RT { | (PID,PP,Dist) | (PID,PP,Dist) | F_ID(n) | E_ID(m) |
| | ⋮ | ⋮ | ⋮ | ⋮ |
| LT { | (PID,PP,Dist) | ✕ | F_ID(n) | E_ID(m) |
| | ⋮ | ✕ | ⋮ | ⋮ |

NETWORK DISCOVERY METHOD

CROSS-REFERENCES TO RELATED APPLICATIONS

This application claims the benefit of the European patent application No. 22197876.0 filed on Sep. 26, 2022, the entire disclosures of which are incorporated herein by way of reference.

FIELD OF THE INVENTION

The invention relates to a method for network discovery, particularly for use in aviation networks. Moreover, the invention relates to a data network, particularly for use on board of an aircraft and/or for communication in aviation.

BACKGROUND OF THE INVENTION

The physical and logical structure of a network is described by its network topology. The topology of a network maps the way different network elements—such as switches, routers or other functional elements capable of participating in the network—are placed, interconnected and set up for dataflows. Hard-wired networks, for example as implemented and installed in aircraft, may be based on fiber optical or copper-based electrical network links. Network links are connected by network switch nodes which together form a certain network topology. There are different types of network topology that may be employed depending on the purpose, intended functionality, control hierarchy and overall network size. Possible topology types are point-to-point (P2P), bus, daisy chain, ring, nested ring, star, tree, mesh as well as any hybrid of mixed type of the aforementioned topology types.

For example, the network backbone in an aircraft may comprise a ring-network topology in order to support multiple redundant paths for increased reliability of the data transmission. Highly critical traffic is routed through different routes of the network using a redundant transmission scheme. The flexibility of such a network topology allows creating a multitude of different layouts and logical structures, depending on the type and size of an aircraft. For example, when employed in an aircraft cabin, various types and numbers of interconnected cabin devices may be implemented in different layouts and sized according to the desired network infrastructure.

During the in-service-life of an aircraft, faulty network elements may be replaced, outdated network elements may be updated with newer versions and/or misinstalled units may be changed around. In complex environments such as aircraft, the general logical network configuration needs to be planned and laid out in advance. In data networks employed in aircraft, it is necessary need to "know" the location of the attached network elements within the logical and physical structure of the network in order to control them according to their logical designation (i.e., their "role").

Document US 2010/0165883 A1 discloses a method that automatically discovers a topology of a communication network ring. The ring includes a plurality of nodes, each including a first and a second port. A ring topology request or a response to the ring topology request is received from at least one node on the ring. The ring topology request or the response to the ring topology request includes an identification of the at least one node and an indication of a hop count needed to reach the at least one node. The ring topology request or the response to the ring topology request is forwarded to at least one neighboring node on the ring through the first port. The topology is determined based on the identification of the at least one node, the hop count, and an identification of the first port.

SUMMARY OF THE INVENTION

One of the objects of the invention is to find improved solutions for automatically detecting network addresses of network elements in a pre-determined network configuration.

According to a first aspect of the invention, a network discovery method, particularly for use in data networks on board of an aircraft, comprises the steps of: sending, by a master node in a logical root hierarchy level of a data network, a discovery message including a forwarding counter to at least one first slave node in the first logical hierarchy level of the data network via at least one child port; increasing, by the at least one first neighboring slave node in the first logical hierarchy level of the data network, the forwarding counter of the received discovery message; forwarding the discovery message with the increased forwarding counter to at least one second slave node in the first logical hierarchy level of the data network; receiving, by the at least one first slave node and the at least one second slave node, context information from the master node regarding the identity of the master node and the at least one child port via which the discovery message had been sent by the master node; determining, by the at least one first slave node and the at least one second slave node, its own functional designation on the basis of the forwarding counter and the received context information from the master node by comparison with a mapping table; and updating the mapping table by matching the recorded functional designation in the mapping table with the identity of the at least one first slave node and the at least one second slave node.

According to a second aspect of the invention, a data network includes a master node and a number of slave nodes connected to the master node on at least one logical hierarchy level, the master node and the number of slave nodes being configured to perform the network discovery method according to the first aspect of the invention.

Although here, in the foregoing and also in the following, some functions are described as being performed by modules or network elements, it shall be understood that this does not necessarily mean that such modules are provided as entities separate from one another. In cases where one or more modules are provided as software, the modules may be implemented by program code sections or program code snippets, which may be distinct from one another but which may also be interwoven or integrated into one another.

Similarly, in cases where one or more modules are provided as hardware, the functions of one or more modules may be provided by one and the same hardware component, or the functions of several modules may be distributed over several hardware components, which need not necessarily correspond to the modules. Thus, any apparatus, system, method and so on which exhibits all of the features and functions ascribed to a specific module shall be understood to comprise, or implement, said module.

According to a third aspect of the invention, an aircraft, in particular a passenger aircraft, comprises a data network according to the second aspect of the invention.

A particular advantage of the solutions according to the invention is that data networks, specifically such as implemented in aircraft, can adapt to changes and still be able to identify network devices unambiguously, despite the network being flexible and temporally dynamic.

A further advantage of the solutions according to the invention is that the number of manual steps needed for installation of an aircraft data network is reduced during manufacture of the aircraft. Moreover, larger networks may be supported, without inefficient means of identifying the network elements. Finally, the solution according to the various aspects of the invention is agnostic to the topology or the mix of topologies used in hard-wired networks such as Ethernet based networks.

According to some embodiments of the first aspect of the invention, the method further comprises the steps of: sending, by at least one of the at least one first slave node and the at least one second slave node, a discovery message including a forwarding counter to at least one first slave node in a second logical hierarchy level of the data network via at least one child port, the second logical hierarchy level being lower in the hierarchy than the first logical hierarchy level; increasing, by the at least one first slave node in the second logical hierarchy level of the data network, the forwarding counter of the received discovery message; forwarding the discovery message with the increased forwarding counter to at least one second slave node in the second logical hierarchy level of the data network; receiving, by the at least one first slave node and the at least one second slave node in the second logical hierarchy level, context information from the at least one of the at least one first slave node and the at least one second slave node in the first logical hierarchy level regarding the identity of the node and the at least one child port via which the discovery message had been sent; determining, by the at least one first slave node and the at least one second slave node in the second logical hierarchy level, its own functional designation on the basis of the forwarding counter and the received context information by comparison with a mapping table; and updating the mapping table by matching the recorded functional designation in the mapping table with the identity of the at least one first slave node and the at least one second slave node in the second logical hierarchy level.

In this manner, the iterated sending of discovery messages together with corresponding context information of network elements already assigned to their respective placement in the logical structure of the data network, the context information will percolate through the various hierarchy levels. First, all slave nodes in the same hierarchy level as the master node will be able to update the mapping table with their respective identities, then the slave nodes dependent on other slave nodes in a higher hierarchy level. This process may continue until all context information has percolated through the entire data network. In some embodiments, the identity of the master node and the identities of the slave nodes may be encoded in uniquely assigned identity information, such as, for example, media access control, MAC, addresses.

According to some embodiments of the first aspect of the invention, the context information may be sent in a context message separate from the discovery message. In some alternative embodiments of the first aspect of the invention, the context information may be included in the discovery message. Discovery and context announcement may be joined or separate messaging procedures, depending on the chosen messaging protocol.

According to some embodiments of the first aspect of the invention, the mapping table may be stored in the master node. The mapping table may in some cases be accessible to each of the connected slave nodes for purposes of updating, or the master node may periodically or on-demand poll the slave nodes in order to gather their identity information and update the mapping table by itself. Additionally, in some embodiments, the steps of the network discovery method may be performed repeatedly in periodic intervals or on-demand in order to keep the mapping table up-to-date. For example, the network discovery method may be performed on start-up of the data network as part of a built-in self-test (BIST) procedure.

According to some embodiments of the first aspect of the invention, the data network includes one or more structural elements of a star topology, a ring topology, a multi-ring topology, a daisy-chain topology and a tree topology.

The above configurations and refinements may be combined with one another as desired where expedient. Further possible embodiments, refinements and implementations of the invention also encompass combinations, which are not explicitly mentioned, of features of the invention described above or below with regard to the exemplary embodiments. In particular, a person skilled in the art will also add individual aspects as improvements or additions to the respective basic form of the present invention.

BRIEF DESCRIPTION OF THE DRAWINGS

The present invention will be discussed in more detail below on the basis of the exemplary embodiments shown in the schematic figures. In the figures.

Figure 1:
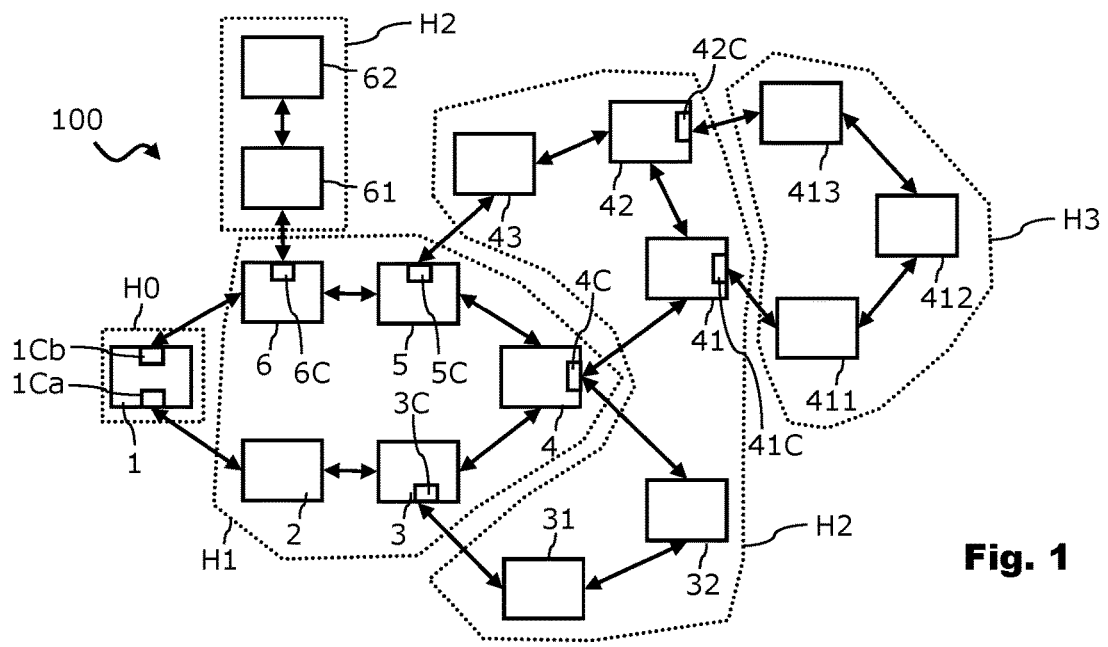
FIG. 1 schematically illustrates a block diagram of the logical structure of a data network according to some embodiments of the invention.

The attached figures are intended to provide improved understanding of the embodiments of the invention. They illustrate embodiments and serve, in conjunction with the description, for the explanation of principles and concepts of the invention. Other embodiments, and many of the stated advantages, will emerge with regard to the drawings. The elements of the drawings are not necessarily shown true to scale relative to one another. Direction-indicating terminology such as, for instance, "top", "bottom", "left", "right", "above", "below", "horizontal", "vertical", "front", "rear" and similar indications are used only for explanatory purposes and do not serve to restrict the generality to specific configurations as shown in the figures.

In the figures of the drawing, elements, features and components which are identical, functionally identical and of identical action are denoted in each case by the same reference designations unless stated otherwise.

DETAILED DESCRIPTION OF THE PREFERRED EMBODIMENTS

The detailed description includes specific details for the purpose of providing a thorough understanding of the present invention. However, it will be apparent to those skilled in the art that the present invention may be practiced without these specific details.

FIG. 1 schematically illustrates a block diagram of the logical structure of a data network 100. The data network may include a mix of various structural topology elements, such as a star topology, a ring topology, a multi-ring topology, a daisy-chain topology and a tree topology. Those topology elements may be hierarchically nested on different logical hierarchy levels. For example, the highest or root hierarchy level H0 may include the master or root node—in the example of FIG. 1 denoted by reference sign 1. The master node 1 is connected to one or more slave nodes on the first hierarchy level H1 via one or more child ports. In the example shown in FIG. 1, the first hierarchy level H1 is structured in a ring topology of five ring nodes 2, 3, 4, 5 and 6 which are implemented in a ring between the two child ports 1Ca, 1Cb of the master node 1.

A second hierarchy level H2 below the first hierarchy level H1 may, for example, include a daisy-chain topology of nodes 61 and 62 which are connected to the child port 6C of the slave node 6. Moreover, the second hierarchy level H2 may include further ring topology structures, such as, for example, the rings with slave nodes 41, 42 and 43 as well as 31 and 32. Those rings may be coupled between child ports 4C and 5C of the slave nodes 4 and 5, and 3C and 4C of the slave nodes 3 and 4, respectively. On a third hierarchy level H3 below the second hierarchy level H2, in this example, may be a further ring topology structure coupled between child ports 41C and 42C of the slave nodes 41 and 42, with slave nodes 411, 412 and 413. It will be obvious that the network configuration of FIG. 1 is exemplary only, and many other combinations of topology structures with different topologies and different numbers of interconnected nodes may equally be possible.

While the logical structure of the data network 100 is pre-determined, each network node is instantiated with a physical network unit or network element. Individually configuring each network unit at a certain installation position within the logical structure of the data network 100 is cumbersome and inefficient. Solutions such as configuring each network unit with its individual network position, producing different units with dedicated identity information tailored for a certain network position or providing pincodes for each installation position in the network may entail increased management effort for spare parts and installation of the network.

Instead, it is proposed in this disclosure to follow the approach of automatically discovering the network topology at run-time by detecting which network units or elements are interconnected at which ports and in which order. The topology information determined through this discovery process is then mapped onto the pre-determined logical structure of the data network 100 in order to match the identity information of the individually implemented network units or elements to the logical position within the network topology.

Figures 2, 3:
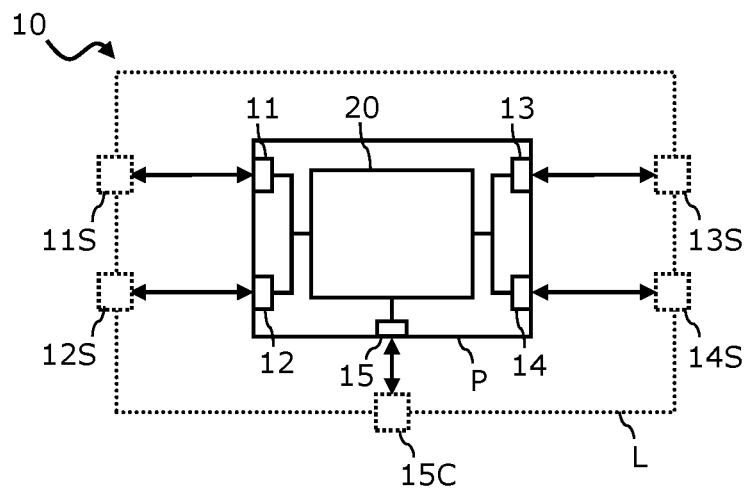
FIG. 2 schematically illustrates a block diagram of a network node in the data network of FIG. 1 according to one embodiment of the invention.
FIG. 3 shows an example for a mapping table used in identifying network nodes for use in a network discovery method according to some embodiments of the invention.

FIG. 2 schematically illustrates an example of a network element 10 which may be installed at any given node in a data network, such as, for example, the data network 100 as exemplarily depicted in FIG. 1. The network element 10 includes the actual physical structure P that is embedded in the logical structure L of one of the network nodes in the data network 100. Without loss of generality, the network element 10 includes processing circuitry 20 in the core that has various input/output ports 11, 12, 13, 14 and 15. In the example shown in FIG. 2, the ports 11 and 12 are configured as downstream sibling ports 11S and 12S, while the ports 13 and 14 are configured as upstream sibling ports 13S and 14S, respectively. Sibling ports are ports that interconnect network nodes on the same hierarchy level. For ring topologies, redundant traffic may be handled by other means, e.g., TSN FRER (Frame Redundancy by Elimination and Replication).

The port 15 in FIG. 2 is configured as child port 15C, i.e., a port that is connected to other network units in the hierarchy level one below the hierarchy level to which the network element 10 belongs. Child ports such as the child port 15C always connect to a sibling port of a lower hierarchy tier.

Each of the logical ports 11S, 12S, 13S, 14S and 15C is marked with an identifier being unique to the relevant network element so that the combination between port identifier and network element identifier leads to a globally unique port identification. Additionally, a further unique identifier is assigned to each functional designation of a network element. FIG. 3 exemplarily shows a mapping table MT that maps a set of unique identifiers in columns MT1 to MT3 to a certain network element E_ID(m) in column MT4, with m being a running index indicating mutually unique element designations. The set of unique identifiers includes one or two 3-tuples comprising the entries of unique identifier E_ID of the parent node (PID), unique identifier of the child port of the parent node to which the element E_ID(m) is coupled (PP) and the distance to the parent node measured in node hops (Dist), Dist being a discrete value on an ordinal scale. For non-faulty ring topologies two 3-tuples will be determined (section RT in the mapping table MT), whereas for non-redundant topologies such as chain topologies, tree topologies, star topologies or similar linear topologies, only one 3-tuple is determined (section LT in the mapping table MT).

The mapping table MT may be stored in one of the network nodes, such as for example the master node 1 of the data network 100. During the planning or design of the logical structure of the data network 100, the topological information is extracted and stored in the mapping table MT. The mapping table MT therefore contains at least one location entry per node, using the known interconnection 3-tuples in the columns MT1 and MT2 as well as the functional designation F_ID(n) in column MT3, with n being a running index indicating mutually unique functional elements. Depending on the type of topology in a particular hierarchy level of the data network 100, one or both 3-tuples in columns MT1 and MT2 are sufficient to identify the network node unambiguously and assign a functional designation F_ID(n) to it.

Figure 4:
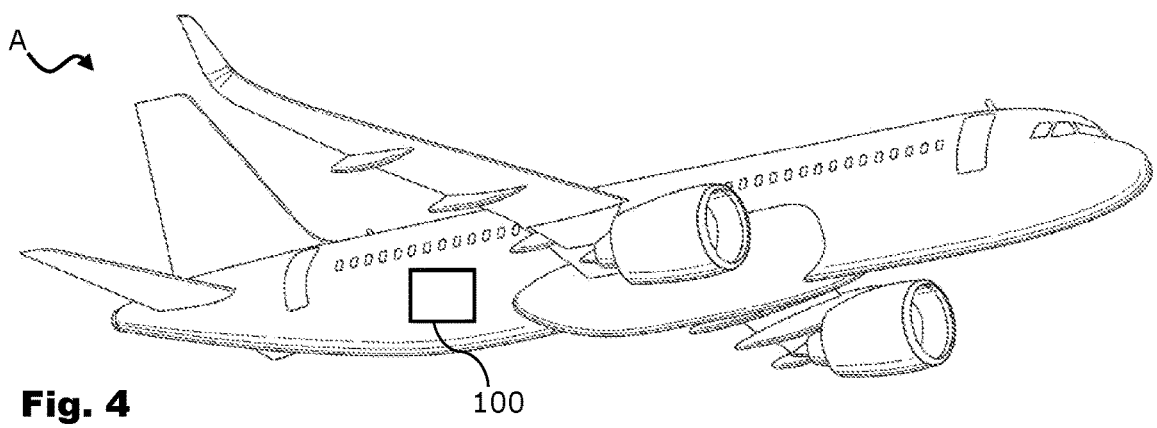
FIG. 4 schematically illustrates an aircraft having a data network according to a further embodiment of the invention.
Figure 5:
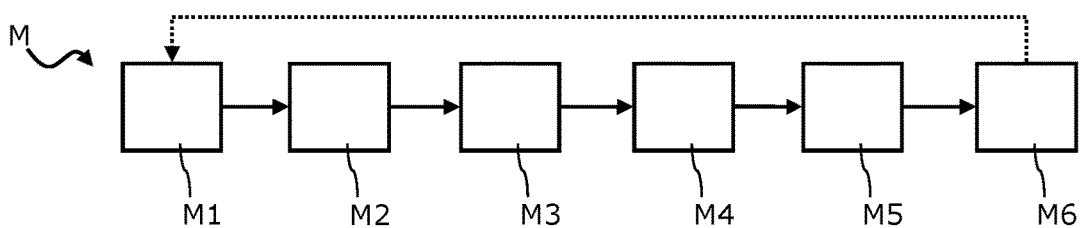
FIG. 5 shows a flowchart of a network discovery method according to some embodiments of the invention.

FIG. 5 shows a flowchart of a network discovery method M. The network discovery method M may for example be used to discover the network topology of a data network, such as the data network 100 shown and explained in conjunction with FIGS. 1 to 3. The network discovery method M may in particular used on board of an aircraft, such as the aircraft A of FIG. 4.

In a first step M1, the master node 1 that is located in a first (or highest tier) logical hierarchy level H1 of the data network 100 will send a discovery message to all neighboring slave nodes connected to child ports 1Ca, 1Cb of the master node. In the example of FIG. 1 those neighboring slave nodes are the nodes 2 and 6. This discovery message may be periodically sent over all child ports 1Ca, 1Cb and includes a forwarding counter which is set to an initial default value of 1. The forwarding counter indicates the number of times that the discovery messages has been forwarded to downstream nodes.

In a second step M2, the receiving slave nodes 2 and 6 in the first logical hierarchy level H1 of the data network 100 increase the forwarding counter of the received discovery message by 1 and forward it—in a third step M3—with the increased forwarding counter to at least one further neighboring slave node in the first logical hierarchy level H1 of the data network 100. In the example of FIG. 1 those further neighboring slave nodes are the nodes 3 and 5. The nodes receiving the discovery messages will store the value of the forwarding counter as its hop distance to its parent node in the same hierarchy level and will forward it over another sibling port with an increased forwarding counter value. If a discovery message is eventually received at another child port or if no further previously unused sibling ports remain in a node, the discover message will be dropped. In the example of FIG. 1, the discovery message travelling clockwise from the child port 1Cb will therefore travel via the nodes 6, 5, 4, 3 and 2 until it terminates at the child port 1Ca. Likewise, the discovery message travelling counterclockwise from the child port 1Ca will travel via the nodes 2, 3, 4, 5 and 6 until it terminates at the child port 1Cb. The different directions in the ring topology of the first hierarchy level H1 in the data network 100 therefore give rise to two 2-tuples to be matched with the mapping table MT.

In a fourth step M4, the slave nodes 2, 3, 4, 5 and 6 receive context information from the master node 1 regarding the identity PID of the master node 1 and the identity PP of the child port (1Ca or 1Cb in the example of FIG. 1) via which the discovery message had been sent by the master node 1. Context announcement will occur within the same packet as the discovery message or may be sent in a separate context message. As the master node 1 is always aware of its own identity, such context announcement may be made immediately. Each slave node which acts as a root node for a part of the network 100 on a lower hierarchy level, such as the levels H2 and H3 in the example of FIG. 1, will only announce its context information once it has determined its own identity information. The values contained in the context information are stored at each node and then periodically forwarded to other sibling ports at the respective node. When the context information is received over a child port, it will be dropped.

After a slave node receives a discovery message and the corresponding context information of the parent node in the same hierarchy level, it knows its location and functional designation. Thus, in a fifth step M5, each slave node determines its own functional designation F_ID(n) on the basis of the forwarding counter and the received context information from the master node 1 or the respective slave node acting as root node in the higher tier hierarchy level by comparison with the entries in the mapping table MT. In a sixth step M6, the mapping table MT is updated—either by the slave node itself or by a central instance such as the master node 1 in the data network 100—by matching the recorded functional designation F_ID(n) in the mapping table MT with the identity E_ID(m) of the respective slave node. The identity E_ID(m) may for example be given by a unique network element identifier, such as a media access control, MAC, address.

As each node (periodically or repeatedly on-demand) sends a discovery and a context message to its children, the information will percolate from the highest hierarchy levels to the lowest hierarchy levels in the data network 100. First, all children of the root or master node 1 will receive the context information of its parent, then the children of the children of the master node 1, and so on. This also covers the case of daisy-chain topology structures that form a sub-ring, where each slave node contains two sibling ports to its neighboring nodes and to the higher level parent nodes at the ends of the sub-ring daisy chain.

FIG. 4 shows an aircraft A comprising a data network, such as, for example, the data network 100 as illustrated in conjunction with FIGS. 1 and 2. The aircraft A may, for example, be a passenger aircraft, and the data network 100 may, for example, be an avionics network or a cabin network.

In order to improve the stringency of the representation, various features were combined in one or more examples in the detailed description above. However, it should be clear in this case that the description above is only of an illustrative and in no way restrictive nature. It is used to cover all alternatives, modifications and equivalents of the various features and exemplary embodiments. Many other examples will be immediately and directly clear to a person skilled in the art on the basis of his technical knowledge in view of the description above.

The exemplary embodiments were chosen and described in order to be able to represent the principles on which the invention is based and their possible uses in practice in the best possible manner. As a result, experts can optimally modify and use the invention and its various exemplary embodiments for the intended purpose. In the claims and the description, the terms "containing" and "having" are used as neutral concepts for the corresponding term "comprising". Furthermore, a use of the terms "a", "an" and "one" is not intended to fundamentally exclude a plurality of features and components described in such a way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A network discovery method, the method comprising:
sending, by a master node in a logical root hierarchy level of a data network, a discovery message including a forwarding counter to at least one first slave node in a first logical hierarchy level of the data network via at least one child port;
increasing, by the at least one first slave node in the first logical hierarchy level of the data network, the forwarding counter of the received discovery message;
establishing a communication link between at least one downstream sibling node via at least one downstream sibling port and at least one upstream sibling node via at least one upstream sibling port, respective to the at least one first slave node, based on a topology of the data network;
forwarding the discovery message with the increased forwarding counter to at least one second slave node, the at least one second slave node being the at least one downstream sibling node or the at least one upstream sibling node, via the at least one downstream sibling port or the at least one upstream sibling port, in the first logical hierarchy level of the data network;

receiving, by the at least one first slave node and the at least one second slave node, context information from the master node regarding an identity of the master node and an identity of the at least one child port via which the discovery message had been sent by the master node;

determining, by each of the at least one first slave node and the at least one second slave node, its own respective functional designation based on the forwarding counter and the received context information from the master node by comparison with a mapping table; and updating the mapping table by matching a recorded functional designation in the mapping table with an identity of the at least one first slave node and an identity of the at least one second slave node.

2. The network discovery method according to claim 1, further comprising:

sending, by at least one of the at least one first slave node and the at least one second slave node, the discovery message including a forwarding counter to at least one first slave node in a second logical hierarchy level of the data network via at least one child port, the second logical hierarchy level being lower in a hierarchy than the first logical hierarchy level;

increasing, by the at least one first slave node in the second logical hierarchy level of the data network, the forwarding counter of the received discovery message;

forwarding the discovery message with the increased forwarding counter to at least one second slave node in the second logical hierarchy level of the data network;

receiving, by the at least one first slave node and the at least one second slave node in the second logical hierarchy level, context information from at least one of the at least one first slave node and the at least one second slave node in the first logical hierarchy level regarding an identity of the at least one of the at least one first slave node and an identity of the at least one second slave node in the first logical hierarchy level and the identity of the at least one child port via which the discovery message had been sent;

determining, by each of the at least one first slave node and the at least one second slave node in the second logical hierarchy level, its own respective functional designation based on the forwarding counter and the received context information by comparison with a mapping table; and updating the mapping table by matching a recorded functional designation in the mapping table with an identity of the at least one first slave node and an identity of the at least one second slave node in the second logical hierarchy level.

3. The network discovery method according to claim 1, wherein the context information is sent in a context message separate from the discovery message.

4. The network discovery method according to claim 1, wherein the context information is included in the discovery message.

5. The network discovery method according to claim 1, wherein the mapping table is stored in the master node.

6. The network discovery method according to claim 1, wherein the data network includes one or more structural elements of a star topology, a ring topology, a multi-ring topology, a daisy-chain topology and a tree topology.

7. The network discovery method according to claim 1, wherein steps of the network discovery method are performed repeatedly in periodic intervals or on-demand in order to update the mapping table.

8. The network discovery method according to claim 1, wherein an identity of the master node and the identities of the at least one first slave node and the at least one second slave node are encoded in uniquely assigned media access control, MAC, addresses.

9. The network discovery method according to claim 1, wherein the method is used in data networks on board of an aircraft.

10. The network discovery method according to claim 1, wherein the mapping table includes one or more unique identifiers based on a topology of the data network, the network discovery network method further including:

determining one 3-tuple for non-redundant topologies; and determining two 3-tuples for non-faulty ring topologies.

11. A data network, comprising:

a master node including master processing circuitry configured to execute instructions to;

send a discovery message including a forwarding counter via at least one child port; and a number of slave nodes connected to the master node on at least one logical hierarchy level, each slave node including slave processing circuitry configured to execute instructions to:

increase, by at least one first slave node in a first logical hierarchy level of the data network, the forwarding counter of the discovery message received from the master node;

establish, by the at least one first slave node, a communication link between at least one downstream sibling node via at least one downstream sibling port and at least one upstream sibling node via at least one upstream sibling port, respective to the at least one first slave node, based on a topology of the data network;

forward the discovery message with the increased forwarding counter to at least one second slave node, the at least one second slave node being the at least one downstream sibling node or the at least one upstream sibling node, via the at least one downstream sibling port or the at least one upstream sibling port, in the first logical hierarchy level of the data network;

receive, by the at least one first slave node and the at least one second slave node, context information from the master node regarding an identity of the master node and an identity of the at least one child port via which the discovery message had been sent by the master node; and determine, by each of the at least one first slave node and the at least one second slave node, its own respective functional designation based on the forwarding counter and the received context information from the master node by comparison with a mapping table;

wherein one of the master node or at least one of the number of slave nodes, via the master processing circuitry or the slave processing circuitry respectively, is configured to execute instructions to update the mapping table by matching a recorded functional designation in the mapping table with an identity of the at least one first slave node and an identity of the at least one second slave node.

12. An aircraft comprising a data network according to claim 11.

* * * * *